UNITED STATES PATENT OFFICE.

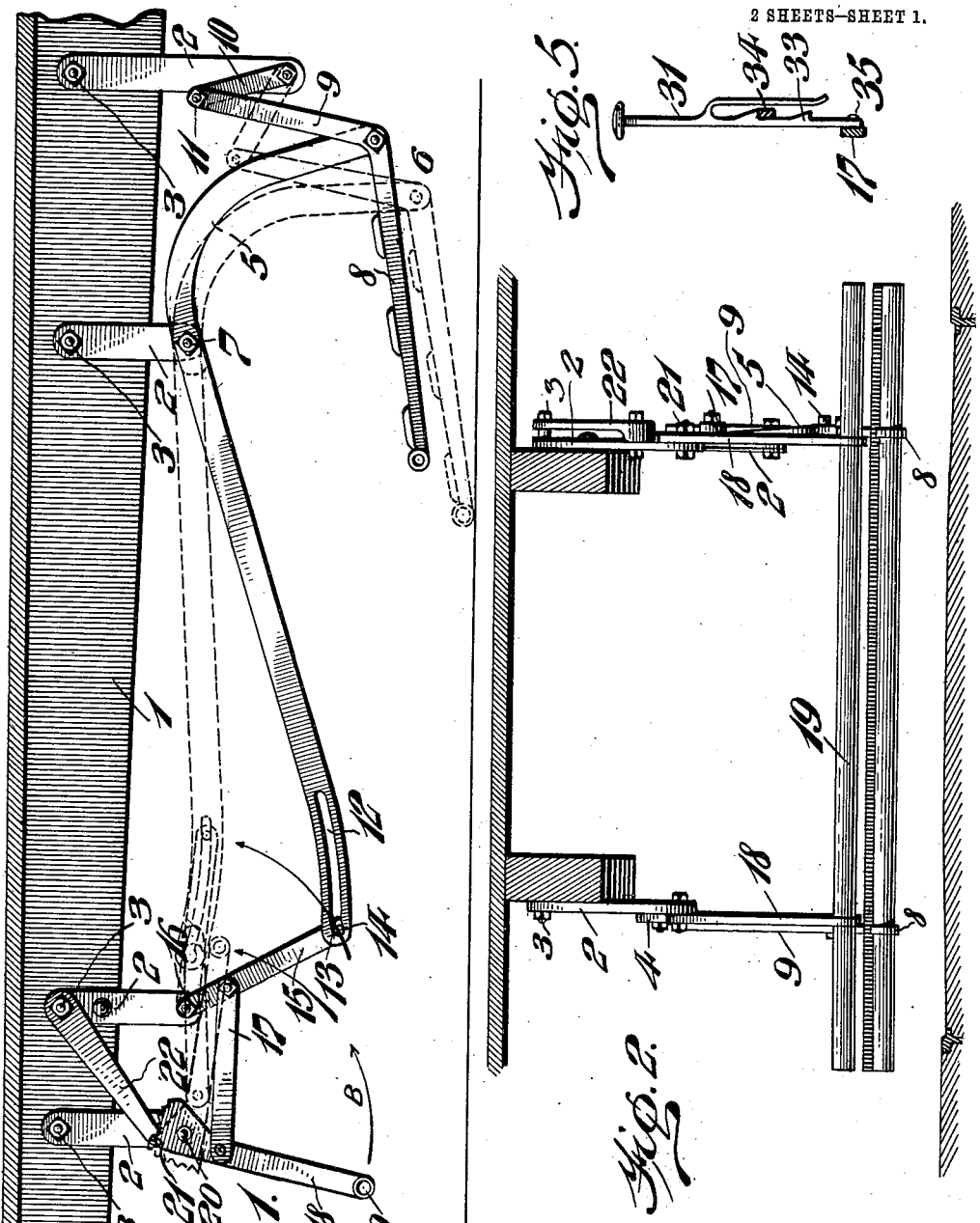

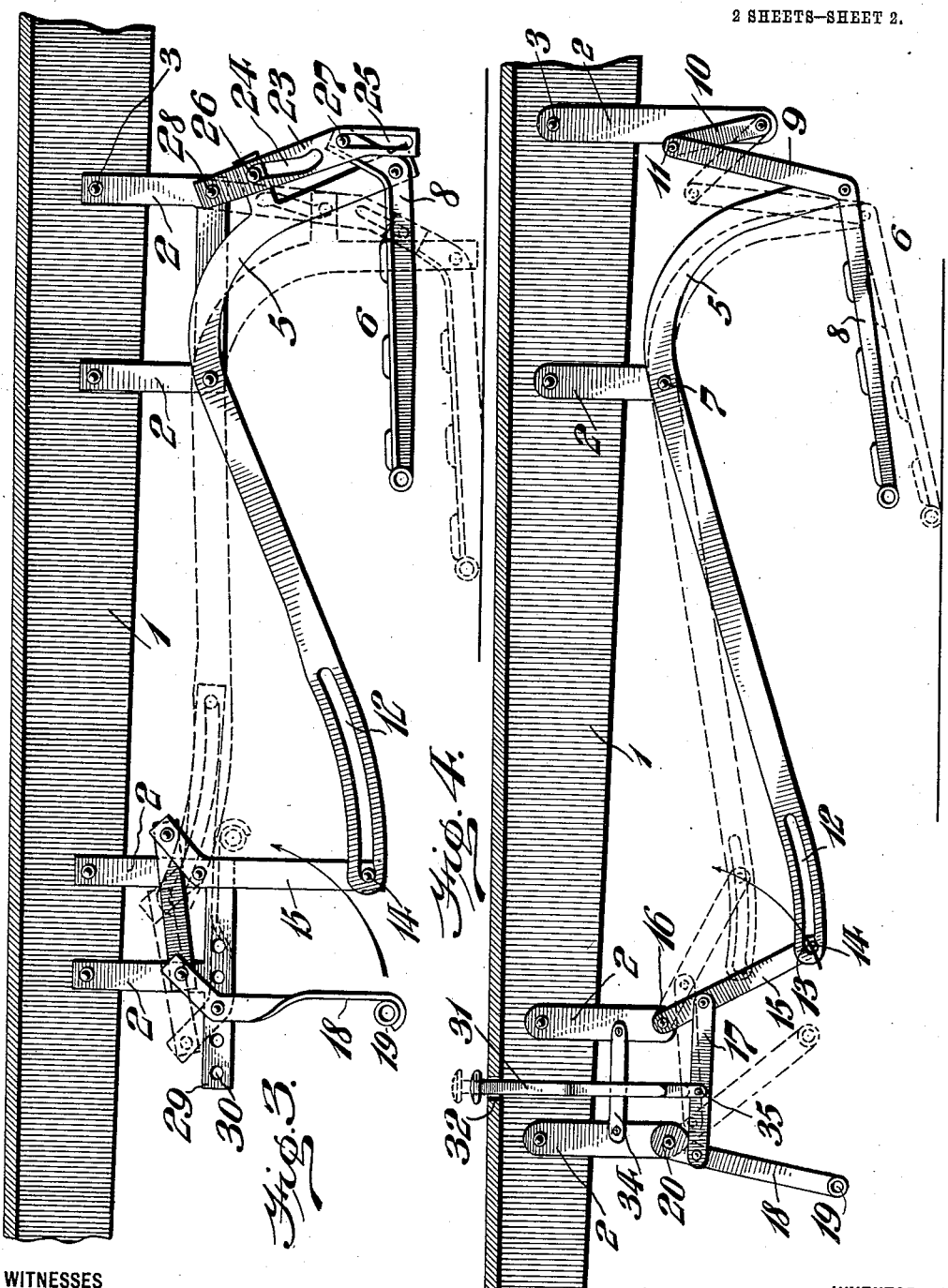

JOHN A. MacMAHON, OF PHILADELPHIA, PENNSYLVANIA.

CAR-FENDER.

1,095,651.    Specification of Letters Patent.    Patented May 5, 1914.

Application filed June 24, 1910. Serial No. 568,652.

*To all whom it may concern:*

Be it known that I, JOHN A. MACMAHON, a subject of the King of Great Britain, residing in the city and county of Philadelphia, State of Pennsylvania, have invented a new and useful Car-Fender, of which the following is a specification.

This invention relates to fenders or guards for trolley cars or the like and relates more particularly to the type of fender known as a trip and drop scoop, wherein a wheel guard is provided which is normally maintained out of the path of an obstacle on the track, but is so attached to the car that the movement of a suitable trip instantly lowers or drops the guard or scoop to a position in front of the wheels.

It has for a further object to provide a fender in which the movement of the guard takes place in a direct ratio or proportion to the movement of the trip, that is to say for a certain movement of the trip a definite movement of the guard takes place, thereby bringing the latter accurately into protecting position.

It has for a further object to provide a fender wherein the action of the parts is positive, the construction simple and effective for the purpose intended and one in which the scoop or guard may not be thrown to operative position by the jarring or jolting of the car in motion.

It has for a further object to provide a fender which may be readily attached beneath a car body and adjusted for the varying distance between the front of the car body and the forward truck wheels, whereby the operating mechanism is correctly positioned.

It further consists of other novel features of construction, all as will be hereinafter fully set forth.

For the purpose of illustrating my invention I have shown in the accompanying drawing one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a side elevation of a fender embodying my invention in its preferred form, showing, in dotted lines, the operative position of the fender. Fig. 2 represents a front elevation of the same. Fig. 3 represents a side elevation of a modified form of my device. Fig. 4 represents a side elevation of my novel fender, showing in dotted lines, the first movement of the parts and also showing a modified form of resetting mechanism. Fig. 5 represents a detail of a modified form of resetting device.

Similar numerals of reference indicate corresponding parts in the figures.

Referring to the drawings: In the above described figures, the fender is shown as attached beneath the body of the car, thus bringing the scoop into more effective relation to the front wheels of the car, while at the same time the entire fender and its adjuncts are protected from injury due to collisions and the like which may occur in the course of ordinary street traffic. Of course the device may be attached to the front of the car, as is customary in the present practice, but such an arrangement is undesirable for the reason that all fenders which are so arranged take up unnecessary space and are exposed to the dangers of street traffic.

1 designates the sills of an ordinary car body, to each of which is preferably attached a plurality of hangers 2 forming a supporting means for my novel fender mechanism, it being of course understood that each of the hangers is fixedly secured by means of a bolt 3 or equivalent device, all of which are positioned so as to correctly locate the mechanism with respect to the forward wheels of the car.

4 and 5 designate, respectively, arms for supporting the scoop member 6, the said arms being pivotally secured to one of the hangers 2 by means of pins 7, as will be apparent. The scoop member 6 preferably consists of side bars 8, each of which is provided with an extension 9, here shown as angularly disposed with relation to the bars 8, the said bars being pivotally supported upon the arms 4 and 5, respectively.

10 designates a link having a pivotal connection at 11 to the extension 9 and pivoted at its other end to one of the hangers 2. This means of connecting the side of the scoop member through a link and pivoted connection to a hanger 2, affords a means of magnifying the movement of the scoop member when acted upon by the movement of the arms 4 and 5. It will be noted that the arm 5 preferably extends forwardly to form a connecting means between the scoop structure and the trip device, presently to be described. This member 5 at its forward end is provided with a slot 12 having a notch or recess 13 at one end, with which coöperates a pin 14 attached to or forming part of a link 15. This link 15 forms a part of the trip mechanism and as here shown is pivotally secured at 16 to one of the hangers 2 and has secured thereto a bar 17 forming a direct connection between it and the buffer. The buffer, in the present instance, consists of the side arms 18 connected together by a suitable buffer rod or the like 19, positioned to intercept any obstacle which may be upon the track. The arms 18 are pivotally secured at 20 to another of the hangers 2 and it will be apparent that any motion of these members in a rearward direction will immediately be transmitted to the link 15 and thus remove the pin 14 from the notch or recess 13, whereupon the pin 14 will engage the cam like surface of the slot 12 and effect a positive movement of the arm 5 and its coöperating adjuncts. It will be noted that I have formed one of the side arms 18 with a ratchet face 21, with which a pivoted pawl 22 normally engages and thus locks the mechanism after any movement to operative position. In connection with the pin 14 and slot connection 12, it will be noted that these two parts should be very accurately fitted and of suitable material to resist wear at this point, since this connection plays an important part in the stability of the fender, the structure being such that movement of the two members is permitted only in the direction of the arrows shown in Fig. 1 of the drawings. It will thus be clear when the pin 14 is in the recess 13 that the scoop or guard will be positively held in its elevated position away from the road bed and the same can only be lowered or dropped by a movement of the trip 18 in the direction of the arrows in Fig. 1. It will be noted that the trip mechanism may be adjusted for variation in the size of car bodies, since it only becomes necessary to insert a link 17 of different length and thus change the distance between the two hangers supporting the trip mechanism, either extending or shortening the distance between the trip and guard.

Particular attention is directed to the pivotal connection of the scoop member 6 to the members 4 and 5, together with the link construction 10, since thereby an initial tilting is given the scoop member, bringing the same into close proximity to the road bed, and thus effectually preventing any portion of a body getting beneath the guard before it drops to operative position.

In the modification disclosed in Fig. 3, I preferably provide a link 23 having slots 24 and 25 therein, the former being adapted to receive a pin 26 secured to the arm 5, while the latter receives a pin 27 secured to the side bar 8. It will also be noted that the link 23 is pivotally mounted at 28 upon the hanger 2, thus providing a mechanism which operates to drop the scoop member 6 proportionately to the movement of the trip 18, while at the same time giving a forward scooping motion effectual to gather in any obstacle upon the track. It will also be noted that in this modification one of the hangers 2 forming a support for the trip mechanism, has a plate 29, preferably integral therewith and provided with openings 30 forming means to shift the trip 18 for different adjustments relative to the size of the car body.

In the modification shown in Fig. 4, I preferably employ a foot or hand lever 31 passing through a suitable opening 32 in the floor of the car, the said lever having a plurality of projections 33 thereon adapted to coöperate with a cross bar 34 secured to the hangers 2. This lever 31, as here shown, is pivotally secured at 35 to the link 17 of the trip mechanism, whereby the latter may be operated by the motorman to drop the scoop or to return the parts to inoperative position after an automatic movement.

In the operation of the device, the fender is fixed in position beneath the car and set in its normal position as shown in Fig. 1, with the pin 14 in locked position with the notch 13. In this position the buffer bar 19 is located so as to contact with an object or the like upon the road bed and should it strike such an object, the pin 14 is immediately released from the notch 13, whereupon a positive movement of the arm 5 takes place, effecting an instant lowering of the scoop 6. It will be noted that gravity plays no action whatsoever in the movement of these parts, as they are all interconnected, and movement of one effects the others in a definite relation, thus bringing the scoop down into position in close proximity to the road bed, with a velocity approximately several times in excess of the speed of the tripping mechanism, in an upward vertical direction.

In connection with the pivotal attachment of the tripping member 18, attention is directed to the desirability of so arranging the trip on its pivots that the center of gravity thereof is on the rear side of a vertical line drawn through the pivotal point of the trip, that is toward the scoop, thereby accurately and tightly holding the pin 14 within the notch 13. The stability of this construction will be apparent when it is seen that a triangle of forces is established by the points 7, 16 and 14 and as the triangle is the most stable figure known, the equilibrium of the scoop can only be disturbed by destroying this triangle of forces, which as here shown, can only be done by a movement of the trip 18 in the direction already noted, either by engagement with a body in the path of a car or by manual operation thereof.

Attention is further directed to the mounting of the scoop or guard so that its center of gravity is always back of the vertical axis of the pivotal point 7, this arrangement maintaining a constant pressure against the pin 14, thereby preventing any possible downward movement of the scoop unless of course the trip is operated to release the pin 14. A perfect lock is thus established until the pin 14 is moved out of the recess 13 in the direction of the arrow by the buffer bar 19 coming in contact with an obstructing body in the path of the car or else by manual action from the platform through the lever 31. It will further be noted that the trip and scoop can never act independently of each other, thereby making the action of the scoop a mechanical certainty, resultant from any movement of the trip.

It will be particularly noted that the lever connection between the guard and car is such that a direct ratio of movement exists between the trip and guard, that is to say, if the trip moves, for example, one inch from the road bed, the buffer end of the guard is swung downwardly and lessens its distance from the road bed by say three inches, or whatever the fixed ratio may be. This is a very important and essential feature in fender construction, since it insures the guard being lowered promptly to prevent any portion of the object on the track getting beneath the guard.

It will now be apparent that I have devised a simple and effective fender for the purpose intended and one in which the number of parts is reduced to a minimum and there is no complicated system of levers, connections or the like liable to get out of order while the self-acting feature is effective and requires no attention to secure prompt and efficient results in moments of emergency.

Particular attention is directed to the fact that there is also less danger in being struck by this device than by that of most previous constructions or designs. The fact that the trip is pivoted and yielding in the direction the object is traveling, that is against the direction of the car, reduces the force of the blow to a minimum, which in itself should prevent many serious injuries.

It will now be apparent that I have devised a novel and useful construction which embodies the features of advantage enumerated as desirable in the statement of the invention and in the above description, and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:

1. In a device of the character stated, a guard, a plurality of arms secured to said guard and pivotally mounted on a car, one of said arms having a recess therein, a trip pivotally secured adjacent said recessed arm, and means fixedly mounted on said trip and co-acting in normal position with said recess to form a lock.

2. In a device of the character stated, a guard, a plurality of arms secured to said guard and pivotally mounted on a car, one of said arms having a recess therein, a trip pivotally secured adjacent said recessed arm, and a pin fixedly mounted on said trip and co-acting in normal position with said recess to form a lock.

3. In a device of the character stated, a guard, arms secured to said guard and pivotally mounted on a car, one of said arms having a recess therein, a trip pivotally secured adjacent said guard arms, a pin on said trip co-acting in normal position with said recess to form a lock, and means to lock said guard in its tripped position.

4. In a device of the character stated, a plurality of arms pivotally mounted on a car, a guard pivoted to said arms, a trip operatively connected to one of said arms to move the same, and means to effect a swinging of said guard relative to said arms during the movement of said arms.

5. In a device of the character stated, a plurality of arms pivotally mounted on a car, a guard pivoted to said arms, a trip operatively connected to one of said arms to move the same, means to effect a swinging of said guard relative to said arms during the movement of said arms, and means to lock said guard in operative position.

6. In a device of the character stated, a plurality of arms pivotally mounted on a car, a guard pivoted to said arms, a trip operatively connected to one of said arms to move the same, and a lever connection between said car and said guard to effect a swinging of said guard relative to said arms during the movement of said arms.

7. In a device of the character stated, a plurality of arms pivotally mounted on a car frame, a guard pivoted to said arms, a trip pivotally secured adjacent said guard arms, and a fixed pin and recess connection between one of said arms and trip, whereby a lock is formed in normal position of said guard.

8. In a device of the character stated, a plurality of arms pivotally mounted on a car, a guard pivoted to said arms, an adjustable trip operatively connected to one of said arms to move the same, and means to effect a swinging of said guard relative to said arms during the movement of said arms.

9. In a device of the character stated, a plurality of arms pivotally mounted on a car, a guard pivoted to said arms, a trip operatively connected to one of said arms, a link pivoted to said car and having a plurality of slots therein, a pin on one of said guard arms and coöperating with one of said slots, and a pin on said guard coöperating with the other of said slots, whereby said guard is swung relative to said arms during a movement of said arms.

10. In a device of the character stated, a plurality of arms pivotally mounted on a car, a guard pivoted to said arms, a trip operatively connected to one of said arms to move the same, and means to effect a movement of said guard, whereby the buffer end of said guard moves a greater distance toward the road bed than the movement of the trip away from the road bed.

11. In a device of the character stated, a plurality of arms pivotally mounted on a car, a guard pivoted to said arms, a trip operatively connected to one of said arms to move the same, and means operated by the movement of said trip to effect a movement of said guard, whereby the buffer end of said guard moves a greater distance toward the road bed than the movement of the trip away from the road bed.

12. In a device of the character stated, a plurality of arms pivotally mounted on a car, a guard pivoted to said arms, a trip operatively connected to one of said arms to move the same, and means attached to said guard directly connected through the arm of said guard to the trip, whereby the speed of said guard toward the ground caused by the movement of the trip is increased over the speed of the trip away from the ground.

JOHN A. MacMAHON.

Witnesses:
ROBERT M. BARR,
C. D. McVAY.

Copies of this patent may be obtained for five cents each, by addressing the "Commissioner of Patents, Washington, D. C."